United States Patent
Weis et al.

(10) Patent No.: US 7,971,732 B2
(45) Date of Patent: Jul. 5, 2011

(54) GRIT TRAP FOR WASTE WATER SYSTEM

(75) Inventors: Frank G. Weis, Kansas City, MO (US); Robert Davis, Peculiar, MO (US)

(73) Assignee: Smith & Loveless, Inc., Lenexa, KS (US)

( * ) Notice: Subject to any disclaimer, the term of this patent is extended or adjusted under 35 U.S.C. 154(b) by 626 days.

(21) Appl. No.: 11/593,352

(22) Filed: Nov. 6, 2006

(65) Prior Publication Data

US 2008/0105604 A1    May 8, 2008

(51) Int. Cl.
*B01D 21/24* (2006.01)
(52) U.S. Cl. ............ 210/532.1; 210/513; 210/519; 210/523; 210/456
(58) Field of Classification Search .......... 210/512.1, 210/456, 519, 523, 532.1, 520, 525, 528, 210/531, 703, 221.2, 221.1, 788, 512.3, 220, 210/513, 521, 538, 540; 241/46.11, 69, 73, 241/DIG. 38
See application file for complete search history.

(56) References Cited

U.S. PATENT DOCUMENTS

| | | | |
|---|---|---|---|
| 2,425,932 A * | 8/1947 | Green et al. | 210/788 |
| 2,450,492 A | 10/1948 | Stevenson | |
| 2,678,730 A * | 5/1954 | Coulter | 210/738 |
| 3,627,132 A * | 12/1971 | Kelly et al. | 210/776 |
| 3,713,595 A * | 1/1973 | Craig et al. | 241/46.11 |
| 3,941,698 A | 3/1976 | Weis | |
| 4,107,038 A | 8/1978 | Weis | |
| 4,519,907 A | 5/1985 | Rooney | |
| 4,767,532 A | 8/1988 | Weis | |
| 4,959,183 A * | 9/1990 | Jameson | 261/87 |
| 5,061,375 A * | 10/1991 | Oyler | 210/744 |
| 6,811,697 B2 | 11/2004 | Davis et al. | |
| 6,855,262 B2 * | 2/2005 | Nyman et al. | 210/800 |

* cited by examiner

*Primary Examiner* — Tony G Soohoo
*Assistant Examiner* — David C Mellon
(74) *Attorney, Agent, or Firm* — Wood, Phillips, Katz, Clark & Mortimer

(57) ABSTRACT

A grit removal unit for a waste water system, including a round grit removal chamber with an input for waste water and an output, a grit storage chamber beneath the grit removal chamber, and an opening between the grit storage chamber and the grit removal chamber. A vertical drive shaft extends through the grit removal chamber into the grit storage chamber, and is rotatable to facilitate waste water flow in the grit removal chamber whereby grit in the waste water is directed toward the opening. A grit size restrictor includes a shear secured to the drive shaft for rotation therewith (the shear including a plate extending radially from the drive shaft above the opening), a first set of bars extending across the opening, and a second set of bars secured to the bottom of the shear plate with the second set of bars positioned adjacent the first set of bars.

8 Claims, 3 Drawing Sheets

GRIT TRAP FOR WASTE WATER SYSTEM

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to waste systems, and more particularly to a grit trap for a waste water system.

BACKGROUND OF THE INVENTION AND TECHNICAL PROBLEMS POSED BY THE PRIOR ART

In many industrial and municipal waste systems, waste water which is laden with grit is pumped from a primary recovery device in the waste stream to a secondary device (e.g., a cyclone separator) which further concentrates the grit. The stream may also pass through a third device (e.g., a screw conveyor) to further dry and concentrate the grit.

However, the waste water stream which enters the waste system often may include long sticks, cans, large solids, and other non-soluble debris. Such debris can disrupt, plug or stop any of the recovery devices from operating. For example, the debris can get into the pumps and piping in the system. It can span openings and wedge in openings, creating an obstruction. Further, smaller materials (e.g., stringy materials such as paper, paper towels, and rags) can get caught in the larger debris and eventually build up a dam that completely plugs pipes and openings. When that occurs, the plug has to be removed, which may require rodding or physically cleaning out the opening. During the process of removing such debris, it may be necessary to shut down the system. Shutting down the system for this purpose is, obviously, undesirable and inefficient.

Screens have therefore been used to block large debris from reaching the recovery devices with the entering waste stream, while still allowing flow through of the waste stream. Such screens require relatively large openings, however, to ensure sufficient waste stream flow, and thus opening sizes have varied from around 3/8" square to 2" wide space between parallel (vertical) bars. As a result, various items of relatively large trash or debris may still pass through the openings and into the recovery devices, including long sticks, tooth brushes and the like through even the square openings, and large objects as well as long sticks, etc. may pass through the larger long openings. Of course, large objects may also pass through to the recovery devices if the screens are not maintained properly, or if larger openings develop around the bottom of the screen.

Grit removal systems such as grit extractors or grit traps have been used in many waste systems to remove grit from the waste water prior to passing the water on to a recovery device of the system. For example, one advantageous apparatus includes flumes for injecting and extracting liquid tangentially relative to a round chamber, creating a circular flow stream which causes the grit to settle near the bottom center of the round chamber. That grit in the injected liquid is thus removed from the liquid stream and collected in the storage chamber for relatively easy removal. Such an apparatus is disclosed in U.S. Pat. No. 6,811,697 B2, the full disclosure of which is hereby incorporated by reference.

U.S. Pat. Nos. 3,941,698, 4,107,038 and 4,767,532 also disclose grit extractor apparatuses. The disclosures of all of these patents are also hereby fully incorporated by reference.

For example, U.S. Pat. No. 4,767,532 discloses an apparatus for removing grit in which a grit storage chamber is provided beneath the center of the round chamber of the grit removal system. A removable plate substantially aligned with the floor of the round chamber generally separates the two chambers, with a central opening through the plate permitting communication between the chambers. A cylindrical shaft is rotatably supported on its upper end above the round chamber and extends down through the round chamber through the plate central opening. Liquid flow in the round chamber causes grit particles to settle toward the chamber floor, where they are urged radially inwardly so as to drop through the plate central opening into the grit storage chamber. A multi-bladed propeller is mounted on that shaft above the plate, and rotates with the shaft to assist in the liquid flow to move the grit toward the plate center opening. A pipe also extends down through the cylindrical shaft into the grit storage chamber, and a pump is provided on the upper end of the pipe to allow grit in the bottom of the storage chamber to be removed by pumping up through the pipe.

In addition to the plate with a central opening as described above, grates, perforates plates, and the like have also been used to separate the chambers while still permitting grit to pass into the grit storage chamber from the round chamber. Such grates, etc. inhibit the flow of grit and debris into such chambers, and also build up a covering which closes off the opening. This not only requires manual unplugging of piping and openings from time to time, but also causes grit which is inhibited from moving into the grit storage chamber to undesirably pass through the grit removal apparatus altogether.

The present invention is directed toward overcoming one or more of the problems set forth above.

SUMMARY OF THE INVENTION

In one aspect of the present invention, a grit size restrictor is provided for a grit removal unit for a waste system having a rotatable drive shaft directing grit in a grit removal chamber toward an opening to a grit storage chamber beneath the grit removal chamber. The restrictor includes a shear secured to the drive shaft for rotation therewith, which shear includes a plate extending radially from the drive shaft above the opening. A first set of bars extends across the opening, and a second set of bars is secured to the bottom of the shear plate and positioned adjacent the first set of bars.

In one form of this aspect of the present invention, a deflector is fixed relative to the opening at a position which is substantially axially aligned with and radially spaced outside of the second set of bars.

In another form of this aspect of the present invention, the outer perimeter of the opening is substantially round with a first diameter and the shear plate outer edge is substantially round with a second diameter, wherein the second diameter is at least about as large as the first diameter. In one further form, the drive shaft extends through the middle of the opening and the bars of the first set of bars project outwardly from the drive shaft to the opening outer perimeter. In another further form, the drive shaft extends through the middle of the shear plate and the bars of the second set of bars project outwardly from the drive shaft beyond the shear plate outer edge, and in a still further form the drive shaft extends through the middle of the opening and the bars of the first set of bars project outwardly from the drive shaft to the opening outer perimeter. In still another further form, the grit removal chamber has a diameter greater than the first diameter, and the opening is defined by a central hole in a plate located over the grit removal chamber.

In another aspect of the present invention, a grit removal unit for a waste water system is provided, including a round grit removal chamber with an input for waste water having grit and trash therein and an output, a grit storage chamber beneath the grit removal chamber, and an opening between the grit storage chamber and the grit removal chamber. A vertical drive shaft extends through the grit removal chamber into the grit storage chamber, and is rotatable to facilitate waste water flow in the grit removal chamber whereby grit in the waste water is directed toward the opening. A grit size restrictor includes a shear secured to the drive shaft for rotation therewith (the shear including a plate extending radially from the drive shaft above the opening), a first set of bars extending across the opening, and a second set of bars secured to the bottom of the shear plate with the second set of bars positioned adjacent the first set of bars.

Other forms of this aspect of the invention include those forms described above in connection with the first aspect of the invention.

DETAILED DESCRIPTION OF THE INVENTION

Figure 1:
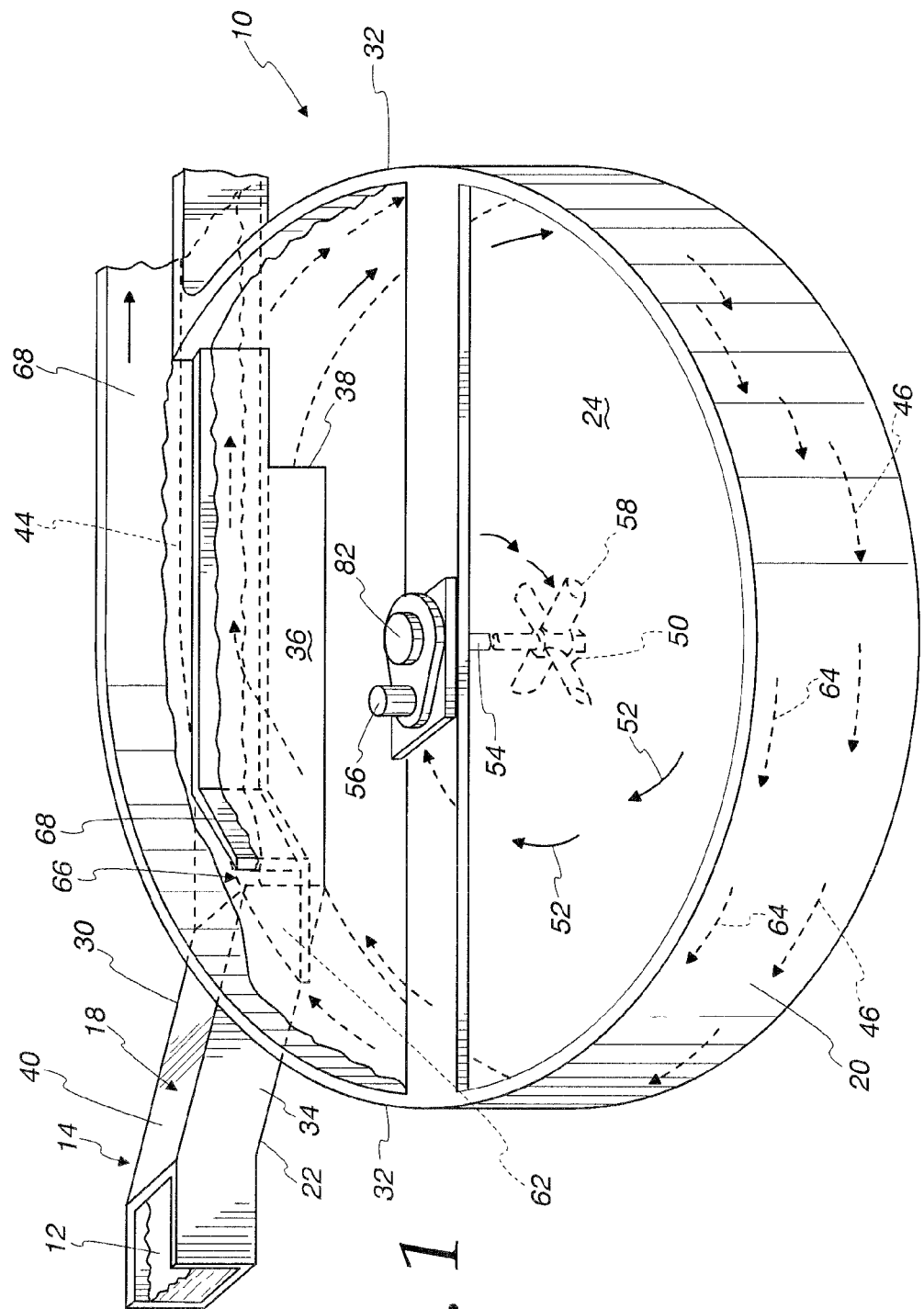
FIG. 1 is a perspective view of a grit removing apparatus with which the present invention may be used.

FIG. 1 discloses a centrifugal grit removal unit or apparatus 10, which is one such apparatus with which the present invention may be advantageously used. The apparatus 10 illustrated in FIG. 1 is like that disclosed in U.S. Pat. No. 6,811, 697 B2, the full disclosure of which has been incorporated herein by reference.

As described in the '697 patent, the apparatus 10 separates grit from grit-laden liquid 12 conveyed into the apparatus 10 by an inlet trough 14 having an inlet conduit 18 that conveys the liquid downwardly at a slight angle. The conduit 18 turns to the horizontal adjacent to a grit removal chamber 20. At the intersection of the chamber 20, a trough bottom 22 is at the same elevation as the bottom or floor 24 of the grit removal chamber 20. One vertical wall 30 of the conduit 18 is tangent to a wall 32 of the chamber 20 where the wall 30 terminates. A vertical wall 34 is parallel to the wall 30 and enters the chamber wall 32 at an inlet location, and continues as wall 36 extending across the chamber 20 to an inlet opening 38 where the grit-laden liquid enters chamber 20, flowing circumferentially around the wall 32 of the chamber. A top 40 of the conduit 18 is parallel to the chamber floor 24 and also functions as the bottom of an effluent flume 44 that extends across the chamber 20. An influent tunnel is formed by the top 40, the wall 36, the floor 24 and the wall 32.

The grit-laden liquid flows from the opening 38 around the inside perimeter of the chamber 20, forming a lower channel of flow 46 as shown by the dashed arrows. The liquid at the wall 32, being of slightly higher head resulting from centrifugal force, flows down the wall 32 to the bottom 24, across the floor 24 to a center hole 50 (described in greater detail below) at the bottom of the chamber 20. The radial velocity component along with the rotation velocity results in a spiral movement of flow 52 shown by the arrows. The grit in this liquid comes in contact with the floor as the liquid is forced into a thin film, spread across the floor 24. The grit contacts the floor and is deposited on the floor. The spiral movement of flow 52 moves the grit across the floor 24 to the center hole 50.

A drive shaft 54 extends vertically into the center of the chamber 20, and is rotatably driven by a gear drive 56 to turn a paddle or multi-bladed propeller 58 at a faster rotary speed than the surrounding liquid. The result is a pumping action across the floor 24, upward from the paddle 58, inducing additional pushing action on the grit. The grit moves across the floor 24, drops down the center hole 50 into the grit storage chamber 60 below (shown in FIG. 2). The grit storage chamber may be as disclosed in U.S. Pat. No. 4,767,532; 4,107,038 or 3,941,698. The floor 24 may be flat or sloped downwardly toward the center hole 50.

The liquid, less the grit, flows in the lower channel of flow 46 around the inside periphery of the apparatus adjacent to the wall 32. The wall 36 and the shelf 62 operate in unison to define the lower and upper channels of flow 46, 64 flowing around the inside perimeter of the chamber 20. The lower channel of flow 46 flows under a shelf 62 and is deflected by the wall 36. Trapped between the shelf 62, the wall 32, the floor 24, and a more slowly rotating inner cylinder of liquid 52, the lower channel of flow 46 is forced upwardly. The channel of flow is now in the upper half of the liquid height, forming an upper channel of flow 64 that flows around an upper perimeter of the chamber adjacent to the wall 32, as shown by the dotted arrows.

The upper channel of flow 64 flows into an outlet opening formed by a flume 66 defined by the wall 32, a wall 68, and the top of the shelf 62. The width of the opening into the flume 66 may be narrower than the entrance width of the inlet trough 40, to create a higher liquid level in the grit removal chamber 20 to force the incoming flow through the more narrow flume opening. The liquid flows through the flume 66 to an exit flume 68, from which it exits the apparatus to a further apparatus or other destination (not shown).

Figure 2:
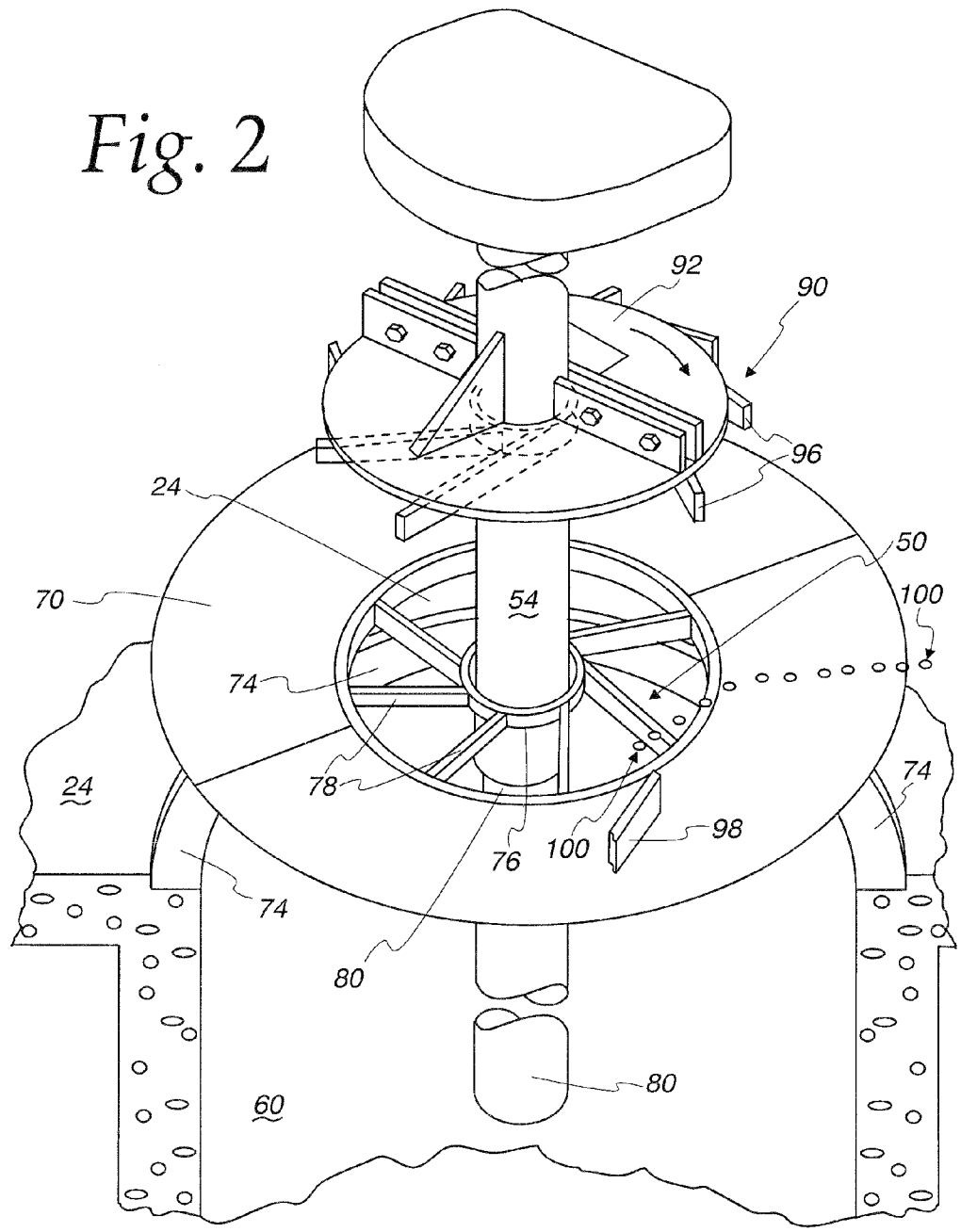
FIG. 2 is an exploded view of the present invention showing the drive shaft of the grit removing apparatus with the shear and plate structure at the entrance to the grit storage chamber.
Figure 3:
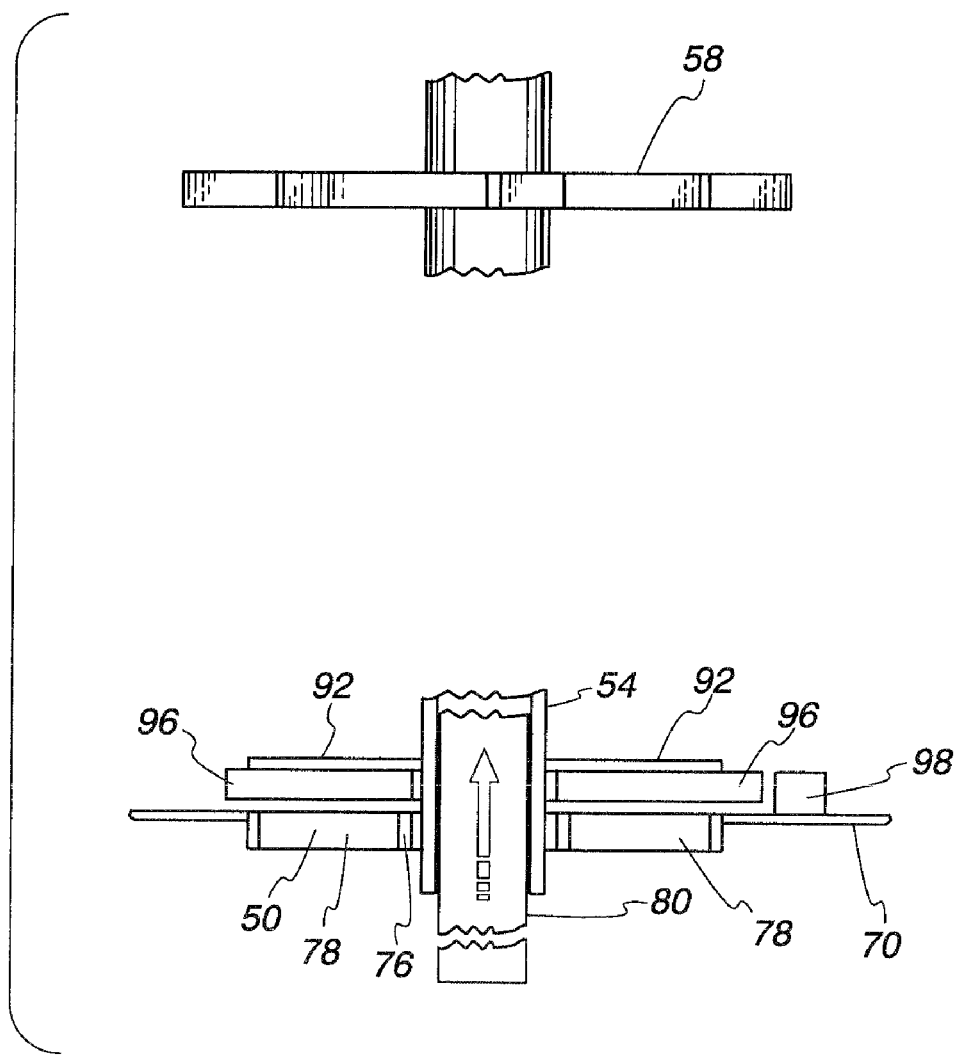
FIG. 3 is a side view of the shear and plate structure of FIG. 2 in operational position.

FIGS. 2 and 3 illustrate the present invention as used with the above described grit removal apparatus 10. Specifically, as illustrated in the exploded view of FIG. 2, a split grate or plate 70 defines the center opening 50 and is sized to fit in a recess 74 in the round chamber floor 24 which is open to the grit storage chamber 60 therebelow. A ring 76 is centered in the center opening 50 and is supported by a plurality of bars 78 projecting inwardly from the plate opening 50. It should be appreciated that the ring 76 will therefore provide a rotation guide at the lower end of the drive shaft 54, with the position of the ring 76 set by the recess 74 in which the plate 70 is placed.

In addition to positioning the ring 76, the bars 78 may advantageously be spaced evenly with a large forward pitch, and placed as close together as desired to define the largest size trash which may pass through the bars 78 into the grit storage chamber 60. Such defined size may be selected in conjunction with the size of the extraction pipe 80 (see FIGS. 2 and 3) which extends down through the cylindrical drive shaft 54 into the grit storage chamber 60. A pump 82 (see FIG. 1) is also provided on the upper end of the pipe 80 and serves to pump grit out of the storage chamber 60 through the pipe 80 such as described, for example, in U.S. Pat. No. 4,767,532. It should be appreciated, however, that the drive shaft 54 itself could serve as the extraction pipe, without requiring a separate pipe 80 inside the shaft 54 such as illustrated in FIGS. 2 and 3.

Also suitably secured near the bottom of the drive shaft 54 (below the multi-bladed propeller 58, not shown in FIGS. 2 and 3) for rotation with the shaft 54 is a shear 90 which includes a radially extending plate 92 having spacer bars or blades 96 secured on the bottom of the plate 92 in an orientation which is steeply pitched forward relative to the direction of rotation. During operation as illustrated in FIG. 3, the shaft 54 is positioned so that the shear 90 is positioned close to the top of the grate 70. The shear plate 92 may advantageously be about the size of the grate center hole 50 so as to overly the entire hole 50 and thereby prevent trash from falling directly down into the grit storage chamber 60 from above.

It should therefore be appreciated that sticks or similar long thin objects are limited in circumference to essentially the height of the spacer bars 96, as the gap through which trash must pass to reach the grit storage chamber 60 is restricted to that size. Moreover, any stick which passes into the center opening 50 will be broken into pieces as the shear spacer bars 96 rotate across the top of the grate bars 78. Further, any sticks that project out of the space between the shear plate 92 and the grate 70 will be broken by a deflector 98 which extends up from the grate 70 slightly beyond the radial extension of the spacer bars 96. Further, large objects which ride around the outside of the shear 90 are deflected away by the deflector 98 as the shear 90 rotates around.

Thus, grit may follow the path 100 shown in FIG. 2 through the center hole 50 of the grate 70 into the grit storage chamber 60. Moreover, it should be appreciated that the spacer bars 96 will advantageously act as pump vanes and scoop grit down between the bars 78 on the grate 70. Accordingly, the problem of grit flow stopping when hydraulic current stops at the restriction as encountered in past structures in which grit size was restricted is avoided and desired operation may be maintained for long periods of operation.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A grit removal unit for a waste water system, comprising:
   a round grit removal chamber defined by a substantially horizontal bottom surface and a substantially annular vertical wall extending up from said bottom surface, with an input for waste water having grit and trash therein and an output;
   a grit storage chamber beneath the bottom surface of the grit removal chamber;
   an opening through said bottom surface between said grit storage chamber and the grit removal chamber;
   a vertical drive shaft extending through said grit removal chamber and said opening into said grit storage chamber, said drive shaft being rotatable to facilitate waste water flow in said grit removal chamber whereby grit in said waste water is directed toward said opening; and
   a grit size restrictor including
      a first set of bars
         extending substantially horizontally across said opening,
         substantially fixed against movement relative to said chamber bottom surface,
         extending substantially from adjacent said drive shaft to the outer boundary of the opening, and
         defining grit openings between the bars of said first set to allow passage of grit from said grit removal chamber through said grit openings into said grit storage chamber,
      a shear secured to said drive shaft for rotation therewith, said rotation including rotation relative to said first set of bars, said shear including a plate having a top and bottom and extending radially from said drive shaft above said opening, said plate extending radially outwardly from said drive shaft at least about as far as the outer boundary of the removal chamber bottom surface opening, and
      a second set of bars secured to the bottom of said shear plate and extending downwardly from said shear plate, said second set of bars being positioned adjacent and close to said first set of bars.

2. The grit removal unit of claim 1, further comprising a deflector fixed relative to said opening at a position which is substantially axially aligned with and substantially adjacent to but radially spaced outside of said second set of bars.

3. The grit removal unit of claim 1, wherein the outer perimeter of said opening is substantially round with a first diameter and said shear plate is outer edge is substantially round with a second diameter, wherein said second diameter is at least about as large as said first diameter.

4. The grit removal unit of claim 3, wherein said drive shaft extends through the middle of said opening and said bars of said first set of bars project outwardly from said drive shaft to said opening outer perimeter.

5. The grit removal unit of claim 3, wherein said drive shaft extends through the middle of said shear plate and said bars of said second set of bars project outwardly from said drive shaft beyond said shear plate outer edge.

6. The grit removal unit of claim 5, wherein said drive shaft extends through the middle of said opening and said bars of said first set of bars project outwardly from said drive shaft to said opening outer perimeter.

7. The grit removal unit of claim 3, wherein said grit removal chamber has a diameter greater than said first diameter, and said opening is defined by a central hole in a plate located over said grit storage chamber.

8. The grit removal unit of claim 3, further comprising a deflector fixed relative to said opening at a position which is substantially axially aligned with and substantially adjacent to but radially spaced outside of said second set of bars.

* * * * *